US009262366B2

(12) United States Patent  (10) Patent No.: US 9,262,366 B2
Lenzmeier et al.  (45) Date of Patent: Feb. 16, 2016

(54) SOFTWARE DEPLOYMENT IN LARGE-SCALE NETWORKED SYSTEMS

(75) Inventors: Charles Thomas Lenzmeier, Silverthorne, CO (US); Yousef A. Khalidi, Bellevue, WA (US); Anil Ingle, Woodinville, WA (US); Saad Syed, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 701 days.

(21) Appl. No.: 11/859,469

(22) Filed: Sep. 21, 2007

(65) Prior Publication Data

US 2009/0083404 A1  Mar. 26, 2009

(51) Int. Cl.
| | |
|---|---|
| G06F 9/445 | (2006.01) |
| G06F 15/177 | (2006.01) |
| G06F 15/16 | (2006.01) |
| G06F 9/455 | (2006.01) |
| G06F 9/44 | (2006.01) |

(52) U.S. Cl.
CPC ........ *G06F 15/16* (2013.01); *G06F 8/60* (2013.01); *G06F 8/63* (2013.01); *G06F 8/65* (2013.01); *G06F 8/68* (2013.01); *G06F 9/45533* (2013.01)

(58) Field of Classification Search
CPC .............. G06F 8/63; G06F 8/65; G06F 8/68; G06F 9/4445; G06F 9/45533
USPC .......... 709/220–222; 717/168, 171, 174, 176; 718/1
See application file for complete search history.

(56) References Cited

U.S. PATENT DOCUMENTS

| | | | | |
|---|---|---|---|---|
| 5,291,595 | A | * | 3/1994 | Martins .......................... 707/200 |
| 5,842,011 | A | * | 11/1998 | Basu ................................. 713/2 |
| 5,842,811 | A | * | 12/1998 | Johnson ........................... 404/25 |
| 6,771,290 | B1 | | 8/2004 | Hoyle |
| 7,213,065 | B2 | | 5/2007 | Watt |
| 2002/0073413 | A1 | * | 6/2002 | Goodman ...................... 717/172 |
| 2002/0078335 | A1 | * | 6/2002 | Cabrera ................ G06F 3/0607 713/1 |
| 2005/0055692 | A1 | * | 3/2005 | Lupini ...................... G06F 8/71 717/174 |
| 2005/0210228 | A1 | * | 9/2005 | Miller et al. ...................... 713/1 |

(Continued)

FOREIGN PATENT DOCUMENTS

| | | |
|---|---|---|
| KR | 1020020003845 A | 1/2002 |
| KR | 1020040088437 A | 10/2004 |

OTHER PUBLICATIONS

Bavier et al., "Operating System Support for Planetary-Scale Network Services," Proceedings of the First Symposium on Networked Systems Design and Implementation, San Francisco, CA, Mar. 29-31, 2004, Usenix Assn., 15 pp.

(Continued)

*Primary Examiner* — Jeong S Park
(74) *Attorney, Agent, or Firm* — Ben Tabor; Kate Drakos; Micky Minhas

(57) ABSTRACT

Software deployment to server nodes within large-scale networked systems is provided using image-based deployment. A mostly immutable image is provided at a central service and transferred from the central service to the server nodes. The image includes a base image, which is immutable, and a delta image, which is writable and provides role-specific and/or node-specific state to the base portion. When a server node receives an image from the central server, the server node stores the image intact without installation. The server node then runs software directly from the stored image.

16 Claims, 4 Drawing Sheets

(56) References Cited

U.S. PATENT DOCUMENTS

| | | | |
|---|---|---|---|
| 2005/0278579 A1* | 12/2005 | Hill | G06F 8/71 714/38.14 |
| 2005/0289533 A1* | 12/2005 | Wang et al. | 717/168 |
| 2006/0059555 A1 | 3/2006 | Holladay | |
| 2006/0173993 A1* | 8/2006 | Henseler et al. | 709/224 |
| 2006/0174238 A1* | 8/2006 | Henseler | G06F 8/63 717/168 |
| 2006/0184937 A1* | 8/2006 | Abels | G06F 8/65 718/1 |
| 2006/0218544 A1* | 9/2006 | Chakraborty | G06F 8/63 717/168 |
| 2006/0277025 A1 | 12/2006 | Iszlai | |
| 2007/0006205 A1 | 1/2007 | Kennedy | |
| 2007/0027973 A1* | 2/2007 | Stein et al. | 709/223 |
| 2007/0046791 A1 | 3/2007 | Wang | |
| 2007/0078988 A1* | 4/2007 | Miloushev | G06F 9/485 709/227 |
| 2007/0101167 A1* | 5/2007 | Lindley et al. | 713/300 |
| 2007/0140242 A1 | 6/2007 | DiGiorgio | |
| 2008/0046708 A1* | 2/2008 | Fitzgerald et al. | 713/2 |
| 2008/0052702 A1* | 2/2008 | Chuang | 717/170 |
| 2008/0271017 A1* | 10/2008 | Herington | G06F 9/45558 718/1 |

OTHER PUBLICATIONS

"VERITAS OpForce: Rapid Server Provisioning," 2005, 2 pp.
Yuezhi Zhou et al., "Virtual Disk Based Centralized Management for Enterprise Networks," SIGCOMM '06 Workshops, Sep. 11-15, 2006, Pisa, Italy, pp. 23-28.
Felix Rauch et al., "Partition Repositories for Partition Cloning—OS Independent Software Maintenance in Large Clusters of PCs," 2000 IEEE, Laboratory for Computer Systems, ETH—Swiss Institute of Technology, Zurich, Switzerland, pp. 233-242.
Extended Search Report in EP 08798639.4 dated Feb. 24, 2012, 8 pages.
Sapuntzakies C., et al. "Virtual Appliances for Deploying and Maintaining Software." Oct. 26, 2003, 13 pages.
"Office Action Issued in Canada Patent Application No. 2,695,469", Mailed Date: Feb. 24, 2015, 5 Pages.
"First Office Action Issued in Korean Patent Application No. 10-2010-7005738", Mailed Date: Jan. 29, 2015, 4 Pages.

\* cited by examiner

SOFTWARE DEPLOYMENT IN LARGE-SCALE NETWORKED SYSTEMS

BACKGROUND

Large-scale networked systems are commonplace systems employed in a variety of settings for running applications and maintaining data for business and operational functions. For instance, a datacenter may provide a variety of web applications (e.g., email services, search engine services, etc.). Large-scale networked systems include a large number of server nodes, in which each node is a physical machine or a virtual machine running on a physical host. Due partly to the large number of server nodes that may be included within such large-scale systems, deployment of software (both operating systems (OSs) and applications) to the various nodes and maintenance of the software on each node can be a time-consuming and costly process. In particular, software is traditionally installed and upgraded locally on each node such that installation and updates are specific to the individual nodes. A number of failures can occur that are only detected during an on-line provisioning and/or update process. Additionally, "bit rot" can occur when a machine is serially upgraded and patched locally. Bit rot refers to changes to a local software state (e.g., OS configuration state) that may occur due to human or software errors. When this state changes, the behavior of the node may become unpredictable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to deploying software to server nodes within large-scale networked systems. Embodiments employ image-based deployment, in which a mostly immutable image is provided at a central service and transferred from the central service to the server nodes. The image includes a base image, which is immutable, and a delta image, which is writable and provides role-specific and/or node-specific state to the base portion. When a server node receives an image from the central server, the server node stores the image intact without installation. The server node then runs software directly from the stored image.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated previously, embodiments of the present invention provide software deployment to server nodes in large-scale network systems using image based deployment. As used herein, an "image" refers to any encapsulated namespace.

Accordingly, in one aspect, an embodiment of the invention is directed to one or more computer-readable media embodying computer-useable instructions for performing a method of deploying software to a number of server nodes within a large-scale networked system. The method includes providing a first image at a central service within the large-scale networked system. The first image includes an immutable portion and a writable portion. The method also includes transferring the first image from the central service to the server nodes. The method further includes storing the first image at each server node without performing an installation of the first image at each server node. The method still further includes running the software directly from the first image at one or more server nodes.

In another embodiment of the invention, an aspect is directed to one or more computer-readable media embodying computer-useable instructions for performing a method of deploying a software update to a number of server nodes in a large-scale networked system. The method includes generating a new image by applying the software update to a previous image. The method also includes transferring the new image from a central service to the server nodes, wherein at least a portion of the nodes are running the previous image. The method further includes storing the new image at the server nodes without installing the new image. The method still further includes running software directly from the new images at one or more server nodes.

A further aspect of the invention is directed to a system including a central service including one or more computing devices for storing an image and transferring the image to a plurality of server nodes. The image has an immutable portion and a writable portion. The server nodes are configured to receive the image from the central service, store the image without installing the image, and boot directly from the image.

Figure 1:
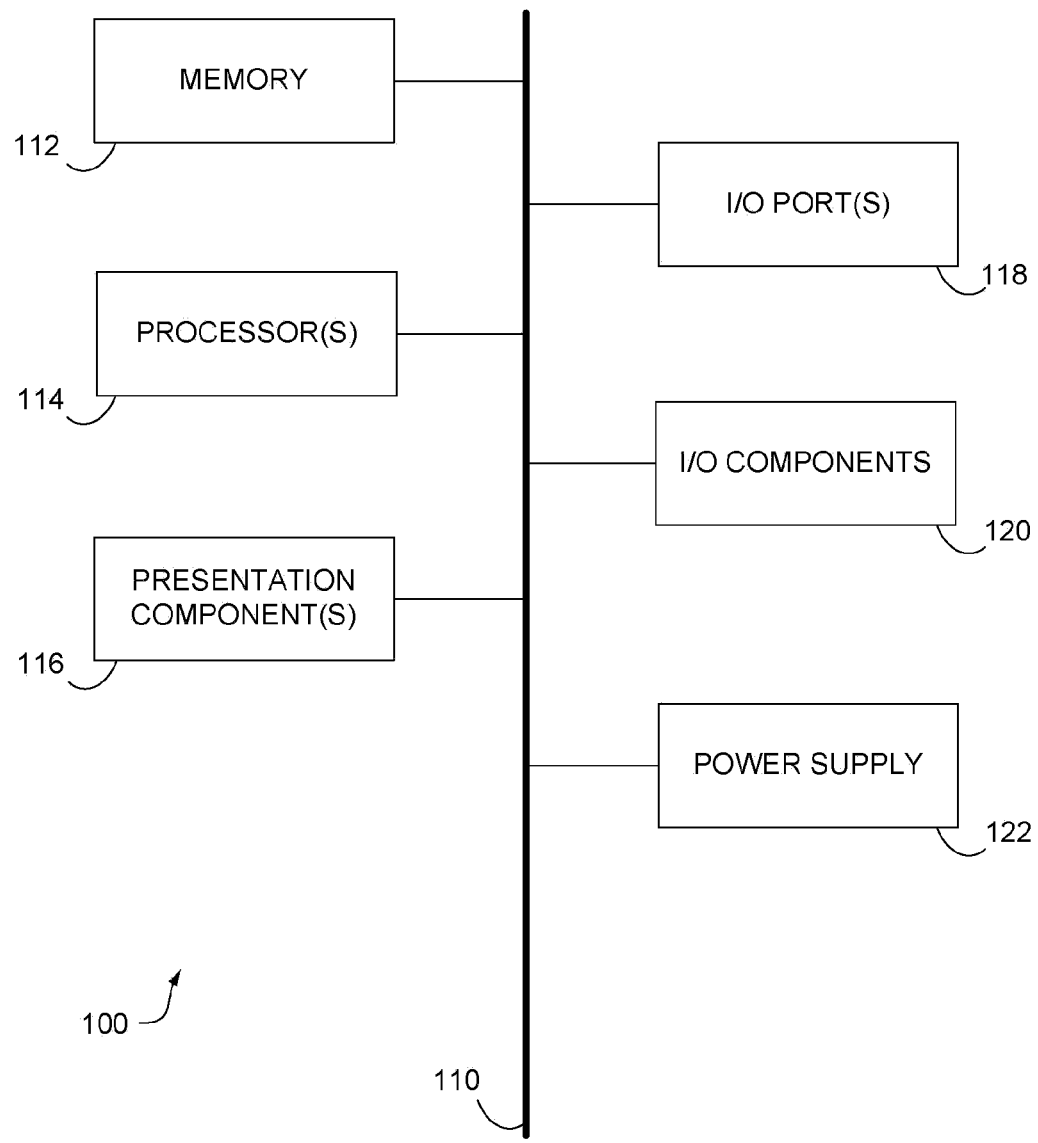
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
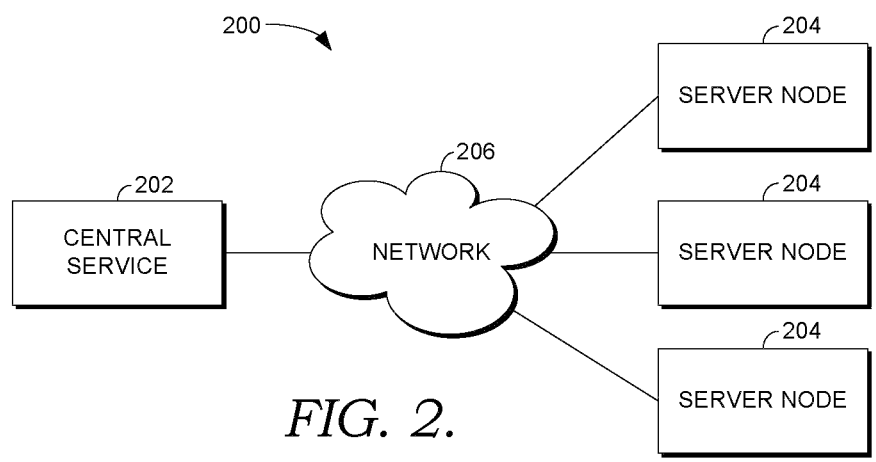
FIG. 2 is a block diagram of an exemplary system in which embodiments of the invention may be employed.

Referring now to FIG. 2, a block diagram is provided illustrating a system 200 that facilitates deploying software to server nodes in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may generally include a central service 202, server nodes 204, and a network 206. Each of the components of the system 200, including the central service 202 and server nodes 204 may comprise any type of computing device, such as computing device 100 described with reference to FIG. 1, for example. The components may communicate with each other via a network 206, which may include, without limitation, one or more local area networks (LANs) and/or wide area networks (WANs). Such networking environments are commonplace in offices, enterprise-wide computer networks, intranets, and the Internet. It should be understood that any number of central services, server nodes, and networks may be employed within the system 200 within the scope of the present invention. Additionally, although many other components of the system 200 are not shown, those of ordinary skill in the art will appreciate that such components and their interconnections are well known. Accordingly, additional details concerning components not shown in the system 200 are not further disclosed herein.

The central service 202 may include one or more computing devices (such as the computing device 100 of FIG. 1) for managing deployment of software (OS and/or applications) to the server nodes 204 within the system 200. The central service 202 is responsible for building and storing the images. Additionally, the central service 202 is responsible for transferring images to the server nodes 204.

Embodiments of the invention employ image-based deployment, by which at least two things are meant. First, each server node 204 is sent an exact image of the software that node 204 is to run. The server node 204 doesn't assemble its software by first installing an OS from one location, then installing additional support software, potentially from another location, and finally installing the application software from a third location. Instead, the server node 204 receives its software in a package, ready to run. Second, the server node 204 runs the software directly from the deployed image. The node 204 doesn't just use the image as a source for installing the software on the machine, as this would be time-consuming and error-prone. Instead, the server node 204 actually boots the OS from the image.

Application state is separated from OS state by deploying at least two distinct images (i.e., an OS image and an application image) to each server node 204. The images are built separately at the central service 202 and remain separate at the server node 204. Applications need to be aware of this separation. Accordingly, in an embodiment, the OS image on which an application runs shows up at a different drive letter than the application image. The specific drive letter assignments are not predefined, but are available to the application through configuration.

Each software image (e.g., an OS image or an application image) in embodiments includes a base image and a delta image. The base image is immutable (or read-only), while the delta image is writable. The delta image serves to provide role-specific and/or node-specific state to the base image. The role-specific and/or node-specific data may be written to the delta image at the central service 202 prior to deployment and/or at an individual server node 204 after deployment. The base image and delta image may be maintained separately at the central service 202 and merged at deploy time.

The separation of OS and applications into separate images combined with the use of base images and delta images, means that the "image" run by a node actually comprises a set of several physical files. Accordingly, an "image" refers to an entire set of files (all base images and delta images). An "OS image" or an "application image" refers to the set of files that make up the disk set (base image and delta image) for the OS image or the application image, respectively.

In one embodiment of the invention, the images are stored using the Microsoft® Virtual Hard Disk (VHD) format, which specifies a virtual machine hard disk that can reside on a native host file system encapsulated within a single file. The VHD format provides differencing disks, in which a single logical disk is maintained in two files: a "base" VHD file and a "delta" VHD file. In embodiments of the invention, common state resides in the base VHD, while per-role and per-node state resides in the delta VHD. The base VHD is read-only, and any changes made to the emulated disk are written to the delta VHD. Although the VHD format is mentioned specifically herein, one skilled in the art will recognize that other packaging technologies (e.g., WIM) may be employed within the scope of embodiments of the invention.

Image-based deployment in accordance with embodiments of the present invention enable rapid and reliable server provisioning in several ways, including the following:

There is no installation phase on the server nodes 204, so once an image is deployed to a server node 204, the node 204 can boot quickly into the assigned software.

Images are assembled centrally at the central service 202, and any errors that occur during this phase are more easily detectable than errors that might occur during per-node installation.

Server nodes 204 boot directly from the image, making it possible to deploy new images (either updates or different roles) in the background, while the nodes 204 are running their current roles. Once the new images are in place, the nodes 204 can boot into their new roles with minimal downtime. In some cases, the old images remain cached on the nodes 204, and, if necessary, the nodes 204 can be rolled back to their previous state with minimal downtime.

Most of the content in the deployed images is identical among all nodes 204, and per-role state and/or per-node state are separated apart from common state using delta images. This allows the common state (the base image) to be sent simultaneously via multicast to all physical nodes 204 running that version of the OS or application image. This reduces the network bandwidth taken by deployment and makes roll-outs happen more quickly.

Similarly, on a virtualization host, the vast majority of the OS data is the same among all assigned guest nodes, and only one copy of the OS base VHD needs to be sent to the host.

Image-based deployment also helps reduce the "bit-rot" problem because patching on server nodes 204 is not required. Instead, when a patch needs to be installed, or a new version of the application is available, a new version of the image is created at the central service 202 and then rolled to the server nodes 204. This allows patch errors to be detected before deployment and ensure that all server nodes 204 run the same set of bits. If, in the course of normal operation, a given node's state becomes corrupt in some way (e.g., because of a disk error), the central service 202 can, because it has the "truth" about the node's state, redeploy the image and get the node 204 back into a known-good state quickly and reliably.

In embodiments, image-based deployment also enables straightforward deployment to both physical and virtual nodes by using the same image format for both modes, allowing the same base image to be deployed to all server nodes 204. To deploy an image for a virtual node, the image is sent to the root partition on the physical server node 204, and then the virtual machine is run with that image attached as an emulated physical disk. To deploy an image for a physical server node 204, an image is sent to a maintenance OS running on the node 204, and the image is stored (as a file) on the physical disk. The server node 204 is then rebooted directly from the image available natively on the disk. For instance, in some embodiments, the server node 204 is rebooted directly from the image using a special driver that makes the image available natively as a disk.

Because image-based deployment separates static state from dynamic state, the wear limit problems of flash drives may be reduced or avoided (by and large) by writing the base image once (i.e., when the image is built at the central service 202) and isolating writes to the delta image. In some embodiments, the base image may be written once and delta images may be kept in RAM, starting with a clean slate every time. This would avoid the wear limit problem altogether, and would be a suitable mode of operation for stateless front-end server nodes.

Image-based deployment further enables the use of diskless modes of operation. For instance, in one embodiment, a server node 204 may use a remote disk image (e.g., using Internet Small Computer System Interface (iSCSI)). In another embodiment, a server node 204 boots from RAM, treating the image as a RAMdisk.

As indicated previously, the central service 202 includes components for building and servicing deployable images.

Images are built offline (that is, not on active server nodes 204) by the central service 202.

For OS images, the central service 202 initially builds the OS base image. In some embodiments, multiple OS base images may be built (e.g., different versions). Service roles build on the OS base image by adding role-specific state. Examples of role-specific state include the enabling of OS optional components, the addition of external software, and the modification of OS settings. The central service 202 makes this role-specific state available for deployment by creating a delta image separate from, but linked to, the OS base image. Together, the common OS base image and the role-specific delta image become the OS image sent from the central service 202 to a server node 204.

In an embodiment, the process of building the delta image involves offline configuration of the image followed by booting the image in an offline virtual machine. This virtual machine boot is used to run "online actions" that are queued during offline configuration once, rather than on every server node 204.

In some embodiments, the central service 202 also allows for node-specific OS configuration settings, such as, for instance, settings specified by an application developer. In addition, there also may be node-specific OS configuration settings generated by the central server 202. These settings are deployed to the server node 204 along with the OS image and are applied at the node 204 to a copy of the role-specific delta image to create a node-specific delta image. The node 204 boots the OS directly from this image.

Application images similarly include a base image and a delta image. In an embodiment, application developers may provide a manifest describing their binaries and configuration settings, and this description is used to build the base image for the application. Node-specific application configuration settings are deployed to the server node 204 along with the application base image and are applied at the node 204 to create a node-specific delta image. The server node 204 runs the application directly from this image.

When OS and application patches and updates are available, the patches and updates are not applied individually at the server nodes 204. Instead, the patches and updates are applied offline at the central service 202 to create new deployment images, which are then deployed to the server nodes 204. By creating new images at the central service 202 and then deploying the images to the server nodes 204, this process helps avoid the problem of failed or partially applied patches on server nodes 204.

As indicated previously, images built at the central service 202 are deployed to the server nodes 204. In other words, images may be transferred from the central service 202 to the various nodes 204 within the system 200. In some embodiments, because base images do not contain per-node state, the same OS and application base images can be used by many server nodes 204. This means that when many nodes 204 need to be provisioned at the same time, the same file needs to be copied many times. To reduce network bandwidth usage, embodiments of the invention use a multicast protocol to send the file to many nodes simultaneously.

After images are received at server nodes 204, the nodes 204 save the images without installation. This allows server nodes 204 to maintain a cache of deployed images. In other words, because images are not installed on server nodes 204, but are instead retained in the image form, it is possible to cache multiple sets of images (e.g., different versions of an OS and/or application) on a server node 204. This design provides flexibility into the system and enables a variety of functions.

First, allowing a server node 204 to include a cache of images provides the ability to rollout new images in the background. In particular, when a new version of an OS or application image is ready to be deployed, the new version can be copied to the destination nodes 204 while those nodes 204 are running the previous version. This means that copy time is not downtime, and copying can proceed at a slower pace if network bandwidth is an issue, or it can happen during lulls in the network load (network bandwidth may also be conserved by using multicast transmission, as discussed hereinabove). Image download is decoupled from image activation, which allows for validation of downloaded images and gives more freedom in deciding when to switch nodes into the new version of the image.

In some embodiments, when a new version of an image is deployed, the previous version is retained in the image cache on the server node 204. If a problem occurs during the rollout sequence—for example, if after activating the image on 500 of 1,000 server nodes 204, it is noticed that the service is not behaving normally—the nodes 204 that have already been moved forward can be rolled back very quickly by rebooting into the previous image. There is no need to download the previous image again or reinstall the previous image. Once the problem has been fixed, the rollout can be repeated. (Note that if the fix doesn't involve changes to the new image, there's no need to recopy the new image.)

Embodiments also facilitate rolling a server node 204 back to a last known good state. Changes that are made to the OS volume or the application volume on a node 204 are stored in the delta image. The original delta image can be saved before the role is activated, and if problems occur because of changes, the original delta image can be restored without copying from the deployment server (i.e., the central service 202).

Additionally, embodiments of the invention allow server nodes 204 to easily switch roles using cached images. In particular, images corresponding to more than one role can be cached on a given server node 204. Accordingly, switching the node 204 from one role to another is as simple as rebooting the node 204. There is no reinstallation cost of making the switch.

Embodiments further facilitate identifying changes to a base image using checksums. The base image is read-only on server nodes 204 because any changes are written to the delta image. This means that changes to the base image that occur due to errors (e.g., disk errors) can be detected through checksums. If such a change occurs, the base image can be recopied to the server node 204.

Figure 3:
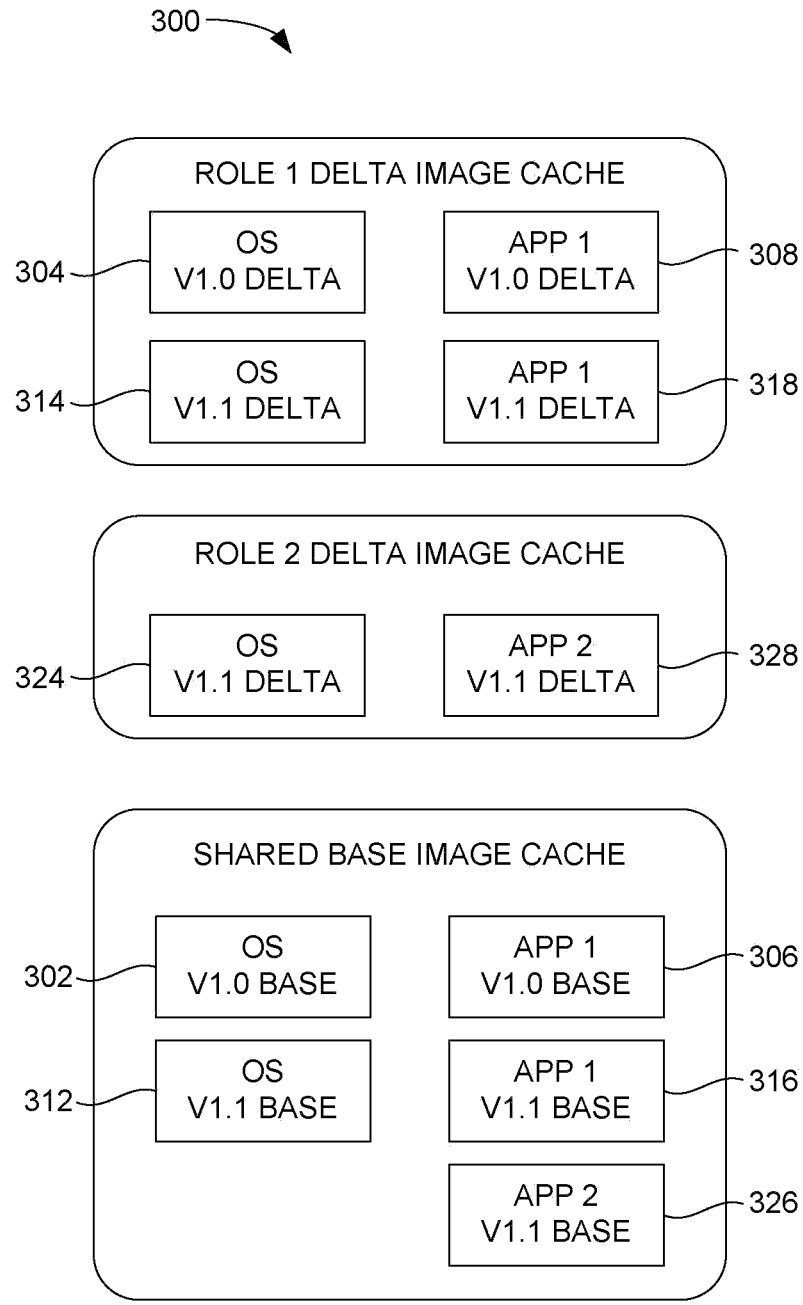
FIG. 3 is block diagram of an exemplary on-node cache storing software images for multiple roles and multiple versions in accordance with an embodiment of the present invention.

By way of illustration only and not limitation, FIG. 3 illustrates a block diagram showing an example of the contents of an on-node image cache 300. In the present example, images are stored in the cached for two roles. For instance, role 1 may allow the server node to provide email services while role 2 may allow the server node to provide search engine services. As indicated previously, by caching images for both roles, the server node may be easily and quickly switched from one role to the other by simply rebooting the node. Additionally, two versions of role 1, version 1.0 and 1.1, are present, while only one version of role 2, version 1.1 is present in the cache. As described above, by caching multiple versions of a particular role, the server node may be quickly rolled back to a previous version if necessary. For instance, if version 1.1 of role 1 is the active role, the server node could be quickly rolled back to version 1.0 of role 1 by rebooting since the previous version is stored in the cache.

As shown in FIG. 3, version 1.0 of role 1 includes the OS v1.0 base image 302, the OS v1.0 delta image 304, the App 1 v1.0 base image 306, and the App 1 v1.0 delta image 308. Version 1.1 of role 1 includes the OS v1.1 base image 312, the OS v1.1 delta image 314, the App 1 v1.1 base image 316, and the App 1 v1.1 delta image 318. Version 1.1 of role 2 includes the OS v1.1 base image 312, the OS v1.1 delta image 324, the App 2 v1.1 base image 326, and the App 2 v1.1 delta image 328. Note that version 1.1 of role 1 and version 1.1 of role 2 both use the OS v1.1 base image 312, so only one copy of that image is stored in the cache and may be shared.

Figure 4:
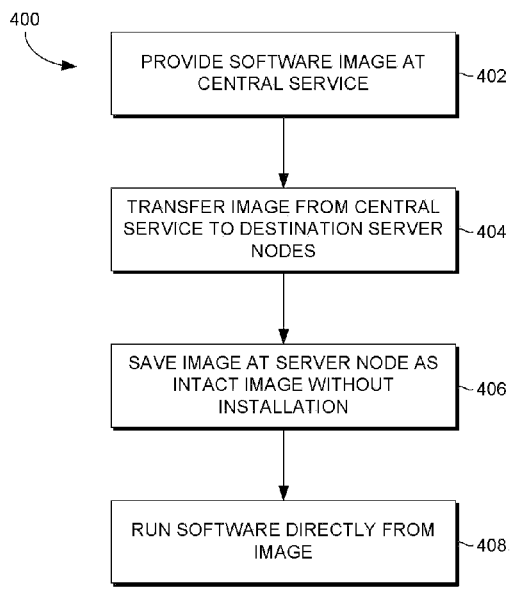
FIG. 4 is a flow diagram showing a method for deploying software to server nodes in a large-scale networked system in accordance with an embodiment of the present invention.

Turning to FIG. 4, a flow diagram is provided illustrating an exemplary method 400 for deploying software to server nodes within a large-scale networked system in accordance with an embodiment of the present invention. Initially, as shown at block 402, a software image is provided at a central service, such as the central service 202 of FIG. 2. The software image may comprise an OS image or an application image. As described above, the software image includes a base image, which is read-only, and a delta image, which is writeable. The delta image is intended to build on the base image by adding role-specific and/or node-specific state. In some embodiments, the central service may maintain multiple OS images and multiple application images and manages deployment of the various images to server nodes within the system (e.g., server nodes 204 of FIG. 2).

As shown at block 404, the image is transferred from the central service to destination server nodes for that image. In particular, a copy of the image at the central service is sent to each of the destination server nodes. When a server node receives an image from the central service, the server node saves the image without installation, as shown at block 406. As noted previously, this contrasts significantly from traditional deployment of software to server nodes. Traditionally, software is installed at each server node, which involves "unpacking" the individual files from the software and copying each individual file to disk. In contrast, in embodiments of the present invention, the image is saved to disk without installation. Accordingly, individual files of the software do not exist as individual files on the server node but, instead, exist only as part of the image.

The server nodes next run the software directly from the image, as shown at block 408. In the case of an OS image, the server nodes boot directly from the OS image. In the case of an application image, the server nodes run the application directly from the image. Accordingly, the server nodes don't just use the image as a source for installing the software on the machines, but instead actually boot the OS from the image in the case of an OS image and run the application from the image in the case of an application image.

Figure 5:
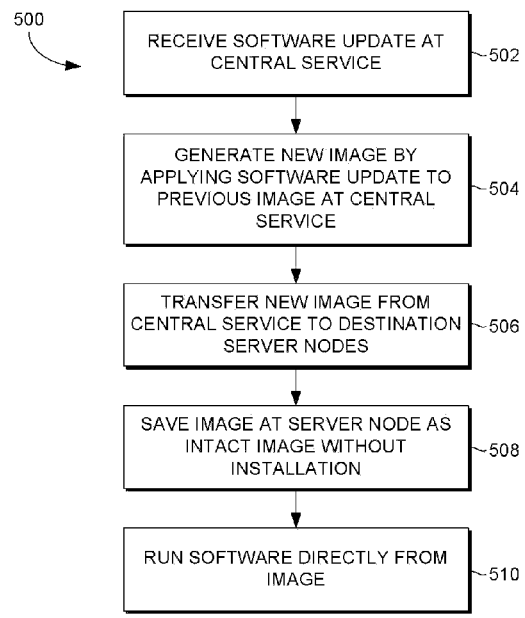
FIG. 5 is a flow diagram showing a method for deploying software updates to server nodes in a large-scale networked system in accordance with an embodiment of the present invention.

As indicated previously, when software patches/updates are available, the patches/updates are applied to images at a central service (e.g., the central service 202 of FIG. 2) as opposed to being applied at individual nodes. An exemplary method 500 for applying a software update in accordance with an embodiment of the invention is illustrated in FIG. 5. Initially, as shown at block 502, a software update is received at a central service. The software update is applied to a copy of a previous image at the central service to generate a new image offline, as shown at block 504. In an embodiment, to generate the new image, the current version of a base image is copied, and the new base image is mounted. The software update is applied, and the new base image is then unmounted. Role-specific delta images may also be regenerated. The new base image and a regenerated role-specific delta image together comprise a generated new image with the software update.

Note that in embodiments, images may be strongly versioned. Accordingly, the previous image may be maintained at the central service in addition to the new image. Accordingly, multiple versions of an OS image or an application image may be maintained at the central service, which may manage deployment of the various versions to different server nodes depending upon each server node's role.

After generating the new image at the central service based on the software update, a copy of the new image is transferred to each destination server node within the system (e.g., the server nodes 204 of FIG. 2), as shown at block 506. A server node may receive the new image while the previous image is running, preventing any downtime during the image transfer. The server node saves the new image to disk without installation, as shown at block 508. Accordingly, the new image is saved to disk as an intact image in addition to any previously cached images on the server node, including the image the server node is currently running.

As shown at block 510, the server nodes next run the software directly from the new image. In the case of an OS image, the server nodes reboot directly from the new OS image. In the case of an application image, the server nodes run the application directly from the image.

As can be understood, embodiments of the present invention facilitate image deployment and management to multiple server nodes within large-scale networked systems. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more hardware computer-readable media embodying computer-useable instructions that, when executed, by one or more processors, causes the one or more processors to perform a method of deploying software to a plurality of server nodes within a large-scale networked system, the method comprising:

creating an operating system (OS) image having an OS base image and an OS delta image and an application image having an application base image and an application delta image at a central service within the large-scale networked system, wherein the a base image is immutable and a delta image is writeable, and wherein the OS image defines an OS state and the application image defines an application state;

building a deployment package that is bootable to run without installation of an OS and an application associated with the OS image and the application image respectively, the deployment package comprising the OS image and the application image, wherein building the deployment package comprises:

generating the OS image and the application image separately, wherein the OS image comprises the OS base image and the OS delta image based on generating the OS base image with a role-specific state, and generating the OS delta image to support the role-specific state, the OS delta image is linked to the OS base image; wherein the OS delta image is maintained separately from the OS base image;

transferring the deployment package from the central service to a subject server node of the plurality of server nodes, wherein the OS image and the application image remain maintained separately;

storing the deployment package at the server node, without performing an installation of OS image and application image thereon; and running the software directly from the deployment package having the OS image and the application image, based on booting the server node to run, without installation, the OS and the application.

2. The one or more computer-readable media of claim 1, wherein the OS state and the application state are separately maintained on the server node based on assigning different drive letters to the OS image and the application image.

3. The one or more computer-readable media of claim 1, wherein at least one of the OS image or the application image is provided in a virtual hard disk (VHD) format, wherein the VHD provides a differencing disk in which a single logical disk is maintained in two files as a base VHD file and a delta VHD file.

4. The one or more computer-readable media of claim 1, wherein the OS image and the application image are deployable to both a physical node and a virtual node.

5. The one or more computer-readable media of claim 4, wherein deploying the deployment package to a physical node comprises:

sending the deployment package to a maintenance OS running on the physical node;

storing the deployment package on the physical disk of the physical node via the maintenance OS; and rebooting the physical node directly from the deployment package on the physical disk.

6. The one or more computer-readable media of claim 4, wherein deploying the deployment package to a virtual node comprises:

sending deployment package to a root partition of the physical node of the server node;

attaching the deployment package as to an emulated physical disk; and running the virtual node based on the deployment package attached to the emulated physical disk.

7. The one or more computer-readable media of claim 1, wherein generating the OS delta image comprises:

configuring the OS delta image offline to queue online actions; and booting the OS delta image in an offline virtual machine.

8. The one or more computer-readable media of claim 7, wherein the method further comprises:

the online actions in the OS delta image, on the offline virtual machine, such that, online actions are obviated on the server node.

9. The one or more computer-readable media of claim 1, wherein the method further comprises:

determining that the server node is designated for a specific role;

identifying OS configuration settings associated with the server node in the specific role;

deploying the OS configuration settings along with deployment package; and applying, at the server node, the OS configuration settings to the OS delta image to create a node-specific delta image.

10. The one or more computer-readable media of claim 1, wherein building the application image having the application base image and the application delta image comprises:

receiving a manifest for the application, the manifest comprising application binaries and application configuration settings; and generating the application image based on the application binaries and the application configuration settings.

11. The one or more computer-readable media of claim 10, further comprising:

identifying node-specific application configuration settings;

deploying the node-specific application configuration settings along with the deployment package; and applying, at the server node, the node-specific applications configuration settings to the application delta image to create a node-specific delta image.

12. One or more One or more hardware computer-readable media embodying computer-useable instructions that, when executed, by one or more processors, causes the one or more processors to perform a method of deploying a software update to a plurality of server nodes in a large-scale networked system, the method comprising:

generating a new image at a central service by applying the software update to a previous image, wherein the new image comprises a base image and a delta image, wherein the base image represents an immutable portion of the new image and the delta image presents a writeable portion, and wherein the new image is one of an operating system (OS) image or an application image;

when the new image is an OS image:

(1) adding a role-specific state to the OS base image;

(2) generating the OS delta image to support the role-specific state, the OS delta image is linked to the OS base image wherein the OS delta image is maintained separately from the OS base image;

(3) providing the OS base image having the role specific state and the OS delta image as the OS image;

transferring the new image from the central service to a server node from the plurality of server nodes, the server node running the previous image;

when the new image is an application image:

(1) identifying node-specific application configuration settings;

(2) deploying the node-specific application configuration settings along with the deployment package; and (3) applying, at the server node, the node-specific applications configuration settings to the application delta image to create a node-specific delta image;

storing the new image at the server node, without performing an installation of the new image, wherein the server node caches the new image and the previous image; and performing a switching operation on the server node, wherein the switching operation comprises:

(a) ceasing running the software directly from the previous image; and (b) rebooting the server node and running the software directly from the new image.

13. A computerized system comprising:

a central service configured for:

creating and transferring, in a deployment package, an operating system (OS) image having an OS base image and an OS delta image and an application image having an application base image and an application delta image, wherein the a base image is immutable and a delta image is writeable, and wherein the OS image defines an OS state and the application image defines an application state;

wherein building the deployment package comprises generating the OS image and the application image separately, wherein the OS image comprises the OS base image and the OS delta image based on generating the OS base image with a role-specific state, and generating the OS delta image to support the role-specific state, the OS delta image is linked to the OS base image; wherein the OS delta image is maintained separately from the OS base image; and a plurality of nodes configured for:

receiving the deployment package from the central service;

storing the deployment package without performing an installation of OS image and application image thereon, and booting directly from the deployment package.

14. The computerized system of claim 13, wherein the OS state and the application state are separately maintained on the server node based on assigning different drive letters to the OS image and the application image, wherein the application is aware of the separation.

15. The computerized system of claim 13, wherein at least one of the OS image or the application image is provided in a virtual hard disk (VHD) format, wherein the VHD provides a differencing disk in which a single logical disk is maintained in two files as a base VHD file and a delta VHD file.

16. The computerized system of claim 13, wherein building an update for the OS image or the application image offline at the central service comprises:

copying an immutable portion of a previous version of the OS image or the application image;

mounting the copied immutable portion;

applying a software update to the mounted immutable portion;

unmounting the updated immutable portion;

regenerating a writable portion of the previous version of the OS image or the application image; and linking the updated immutable portion to the regenerated writable portion while maintaining the updated immutable portion and the regenerated writable portion separately at the central service.

* * * * *